US012101737B2

(12) United States Patent
Xu et al.

(10) Patent No.: US 12,101,737 B2
(45) Date of Patent: Sep. 24, 2024

(54) PAGING OCCASION AND PAGING EARLY INDICATION CONFIGURATION FOR DIFFERENT TYPES OF USER EQUIPMENTS

(71) Applicant: QUALCOMM Incorporated, San Diego, CA (US)

(72) Inventors: Huilin Xu, Temecula, CA (US); Jing Lei, San Diego, CA (US); Yuchul Kim, San Diego, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/491,181

(22) Filed: Sep. 30, 2021

(65) Prior Publication Data

US 2023/0104440 A1    Apr. 6, 2023

(51) Int. Cl.
*H04W 68/00* (2009.01)
(52) U.S. Cl.
CPC .................................. *H04W 68/00* (2013.01)
(58) Field of Classification Search
CPC ................................................... H04W 68/00
USPC ........................................................ 455/458
See application file for complete search history.

(56) References Cited

U.S. PATENT DOCUMENTS

2017/0311316 A1* 10/2017 Chendamarai Kannan .................
H04W 72/0446

FOREIGN PATENT DOCUMENTS

| CN | 115884073 | * | 3/2023 | ............ H04W 68/00 |
| CN | 115884073 | A | * | 3/2023 | |
| EP | 4087341 | A1 | * | 11/2022 | ............ H04W 48/12 |
| WO | 2021159244 | A1 | | 8/2021 | |
| WO | 2021162617 | A1 | | 8/2021 | |

OTHER PUBLICATIONS

Intel Corporation: "Procedure Details for Network Assigned Subgrouping", 3GPP TSG RAN WG2 Meeting #113bis-e, R2-2102871, 3rd Generation Partnership Project, Mobile Competence Centre, 650, Route Des Lucioles, F-06921 Sophia-Antipolis Cedex, France, vol. RAN WG2, No. E-Meeting, Apr. 12, 2021-Apr. 20, 2021 Apr. 2, 2021, XP052174444, 3 Pages.
International Search Report and Written Opinion—PCT/US2022/044757—ISA/EPO—Jan. 12, 2023.

(Continued)

*Primary Examiner* — Ted M Wang
(74) *Attorney, Agent, or Firm* — Patterson + Sheridan, LLP

(57) ABSTRACT

Certain aspects of the present disclosure provide techniques for paging occasion (PO) and paging early indication (PEI) configurations. In particular, the present disclosure provides techniques for configuring various paging parameters on different types of user equipments (UEs), including, such as, reduced capability (RedCap) UEs. For example, a network entity transmits signaling jointly configuring at least first and second types of UEs having different capabilities with a first set of paging parameters. The network entity transmits signaling that separately configures at least the first and second types of UEs with a second set of paging parameters. The network entity communicates with the first and the second types of UEs in accordance with the first and second set of paging parameters.

14 Claims, 10 Drawing Sheets

(56) References Cited

OTHER PUBLICATIONS

Lenovo et al., "Paging Enhancement for UE Power Saving", 3GPP TSG RAN WG1 Meeting #106-e, R1-2107182, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021 Aug. 7, 2021, XP052038210, pp. 1-6.

* cited by examiner

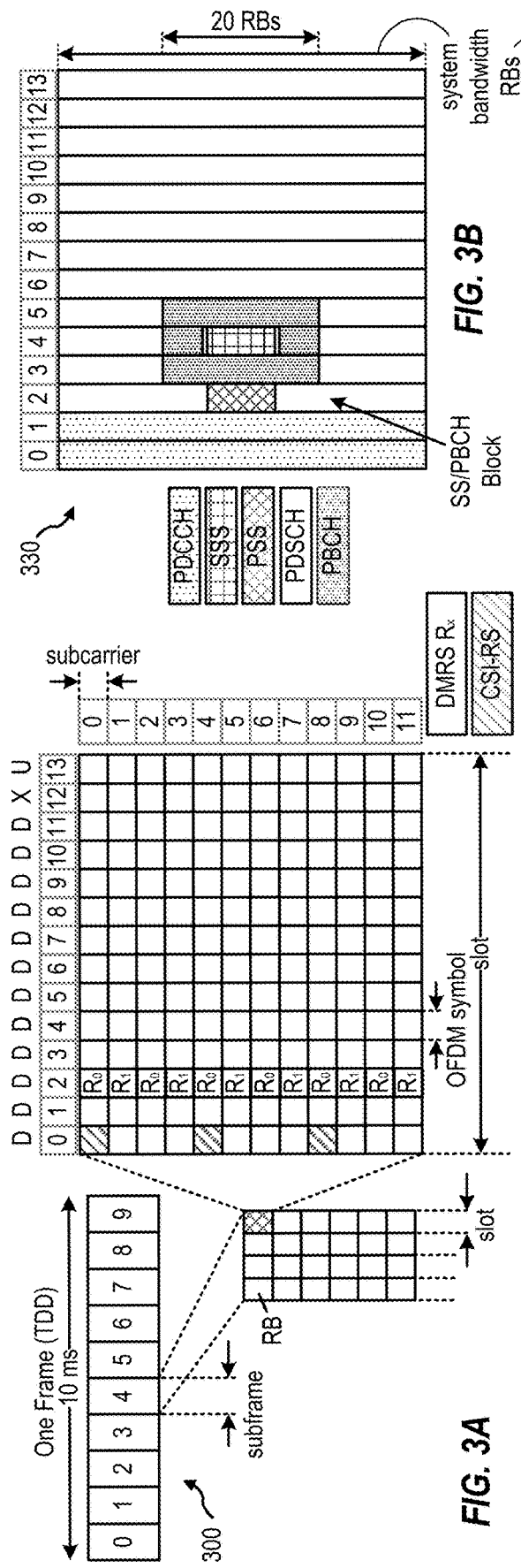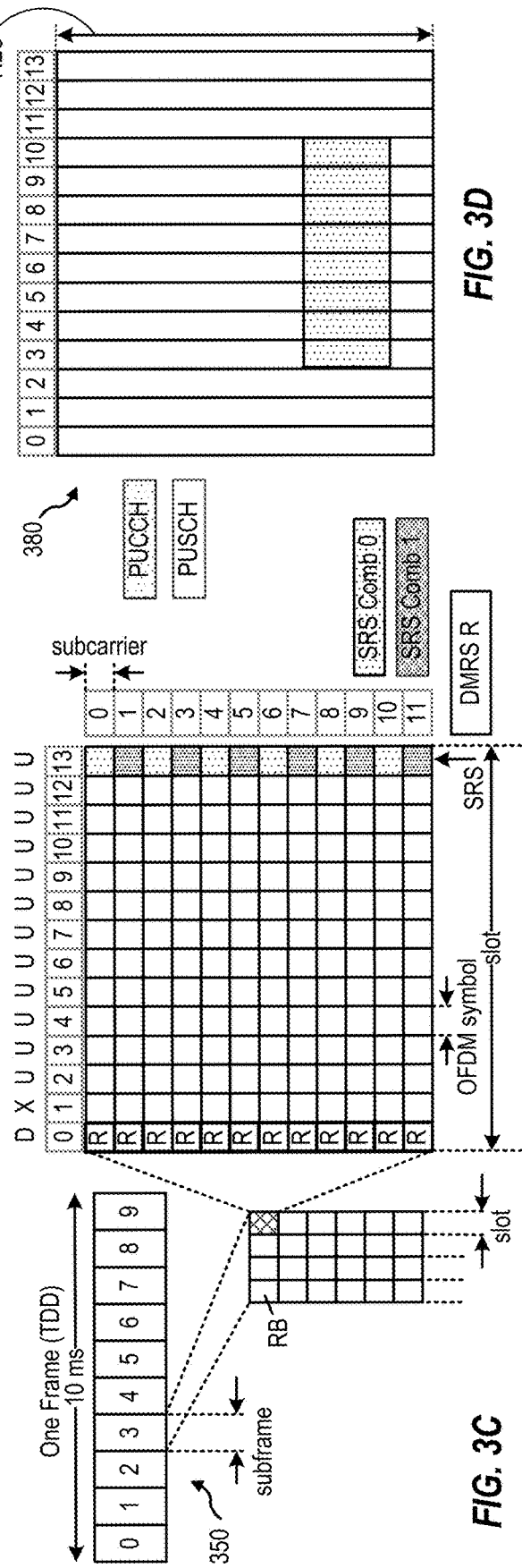

800

A METHOD FOR WIRELESS COMMUNICATIONS BY A USER EQUIPMENT (UE)

810
RECEIVE, FROM A NETWORK ENTITY, SIGNALING JOINTLY CONFIGURED FOR AT LEAST FIRST AND SECOND TYPES OF USER EQUIPMENTS (UES) HAVING DIFFERENT CAPABILITIES WITH A FIRST SET OF PAGING PARAMETERS

820
RECEIVE, FROM THE NETWORK ENTITY, SIGNALING SEPARATELY CONFIGURED FOR THE UE WITH A SECOND SET OF PAGING PARAMETERS

830
COMMUNICATE WITH THE NETWORK ENTITY IN ACCORDANCE WITH THE FIRST AND SECOND SETS OF PAGING PARAMETERS

*FIG. 8*

PAGING OCCASION AND PAGING EARLY INDICATION CONFIGURATION FOR DIFFERENT TYPES OF USER EQUIPMENTS

INTRODUCTION

Aspects of the present disclosure relate to wireless communications, and more particularly, to techniques for paging occasion (PO) and paging early indication (PEI) configurations.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a network entity. The method includes transmitting signaling jointly configuring at least first and second types of user equipments (UEs) having different capabilities with a first set of paging parameters; transmitting signaling separately configuring at least the first and second types of UEs with a second set of paging parameters; and communicating with the first and second types of UEs in accordance with the first and second sets of paging parameters.

One aspect provides a method for wireless communications by a UE. The method includes receiving, from a network entity, signaling jointly configured for at least first and second types of UEs having different capabilities with a first set of paging parameters; receiving, from the network entity, signaling separately configured for the UE with a second set of paging parameters; and communicating with the network entity in accordance with the first and second sets of paging parameters.

One aspect provides an apparatus for wireless communications by a UE. The apparatus includes a memory and a processor coupled with the memory. The processor and the memory are configured to receive, from a network entity, signaling jointly configured for at least first and second types of UEs having different capabilities with a first set of paging parameters; receive, from the network entity, signaling separately configured for the UE with a second set of paging parameters; and communicate with the network entity in accordance with the first and second sets of paging parameters.

One aspect provides non-transitory computer readable medium storing instructions that when executed by a UE cause the UE to: receive, from a network entity, signaling jointly configured for at least first and second types of UEs having different capabilities with a first set of paging parameters; receive, from the network entity, signaling separately configured for the UE with a second set of paging parameters; and communicate with the network entity in accordance with the first and second sets of paging parameters.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 8 shows an example method by a UE for paging configuration, according to aspects of the present disclosure.

DETAILED DESCRIPTION

Figure 1:
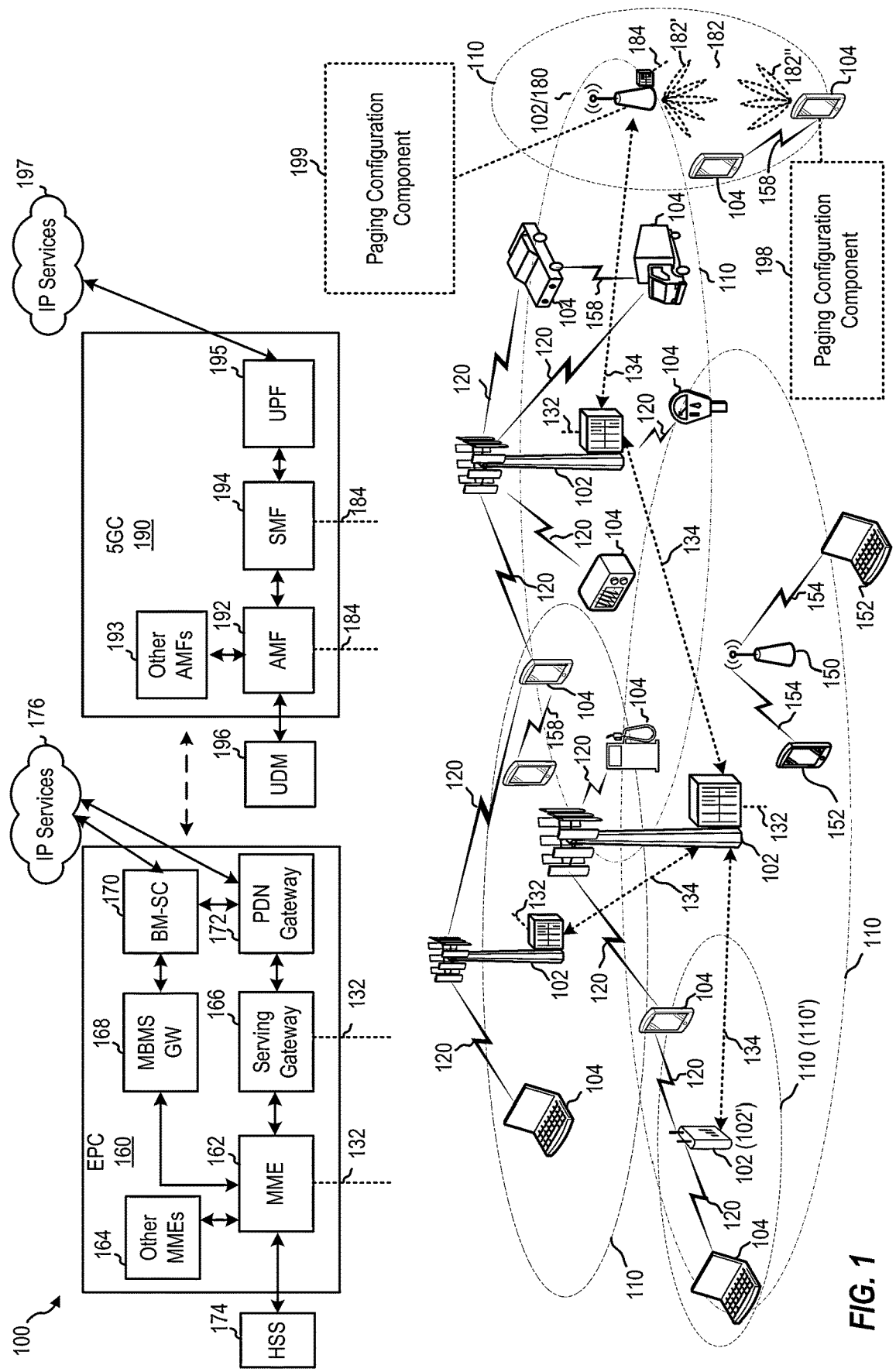
FIG. 1 is a block diagram conceptually illustrating an example wireless communication network.

Aspects of the present disclosure provide apparatuses, methods, processing systems, and computer-readable mediums for paging occasion (PO) and paging early indication (PEI) configurations. In particular, the present disclosure provides techniques for configuring various paging parameters on different types of user equipments (UEs), such as conventional (normal capability) UEs and reduced capability (RedCap) UEs.

According to certain aspects, a network entity transmits signaling jointly configuring at least first and second types of UEs having different capabilities with a first set of paging parameters. The network entity transmits signaling that separately configures at least the first and second types of UEs with a second set of paging parameters. The network entity communicates with the first and the second types of UEs in accordance with the first and second set of paging parameters.

As an example, a UE may save battery power by entering an idle or inactive mode while monitoring paging information (e.g., at sparse occasions), such as physical downlink control channel (PDCCH), from the network to receive system information block (SIB) updates, earthquake and tsunami warning system (ETWS) messages, and various other messages when the UE is paged. To improve power efficiencies at the UE, a paging early indication (PEI) may be used as a preceding notice before the transmission of paging occasions (POs), such that the UE needs not process all POs received. For example, a PEI may inform the UE whether the UE needs to further process POs following the PEI. A PO may include paging PDCCH and paging physical downlink share channel (PDSCH).

A RedCap UE may be defined as a lower tier (e.g., lower capability than regular UEs) device that is simple and low cost. The paging configurations for RedCap UEs and non-RedCap UEs can thus be substantially different and often require separate configurations. For example, the paging rates, the discontinuous reception (DRX) cycles, application delays, the number of synchronization signal blocks (SSBs) between PEI and POs, the number of repetitions of paging PDCCH monitoring occasions or PEI occasions, may all be different for RedCap UEs and non-RedCap UEs.

These parameters enable the UE to take advantage of paging mechanisms that save energy. For example, the UE may be configured with the DRX cycle to stay in a sleep mode. The UE periodically wakes up and monitor PDCCH to check for a paging message (e.g., encrypted by paging radio network temporary identifier P-RNTI). If the PDCCH indicates that a paging message is transmitted in the subframe, the UE demodulates the physical channel to validate if the paging message is directed to the physical channel. A PO is a subframe where there may be P-RNTI transmitted on PDCCH addressing the paging message. PEI may apply to UE subgroups for paging enhancements, such as to improve power efficiency by avoiding processing certain POs.

The present disclosure provides techniques for paging configurations for different types of UEs, so as to overcome the difficulties related to separate paging configuration requirements and to facilitate energy efficiencies of the paging mechanisms. For example, joint configuration may be provided to different types of UEs for saving signaling overhead. In some cases, joint PEI may also be provided to different types of UEs.

Introduction to Wireless Communication Networks

FIG. 1 depicts an example of a wireless communications system 100, in which aspects described herein may be implemented.

Generally, wireless communications system 100 includes base stations (BSs) 102, two or more different types of user equipments (UEs) 104, one or more core networks, such as an Evolved Packet Core (EPC) 160 and 5G Core (5GC) network 190, which interoperate to provide wireless communications services. According to the present disclosure, the two or more different types of UEs include at least one reduced capability (RedCap) UE and at least one non-RedCap UE (e.g., a regular UE). In some cases, the BS 102 may transmit one or more joint configuration or joint signaling to the two or more different types of UEs 104.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes paging configuration component 199, which may be configured to process transmissions based on TCI states mapped to TCI codepoints indicated Wireless network 100 further includes paging configuration component 198, which may be used configured to perform downlink and uplink panel switching according to indicated TCI states.

Figure 2:
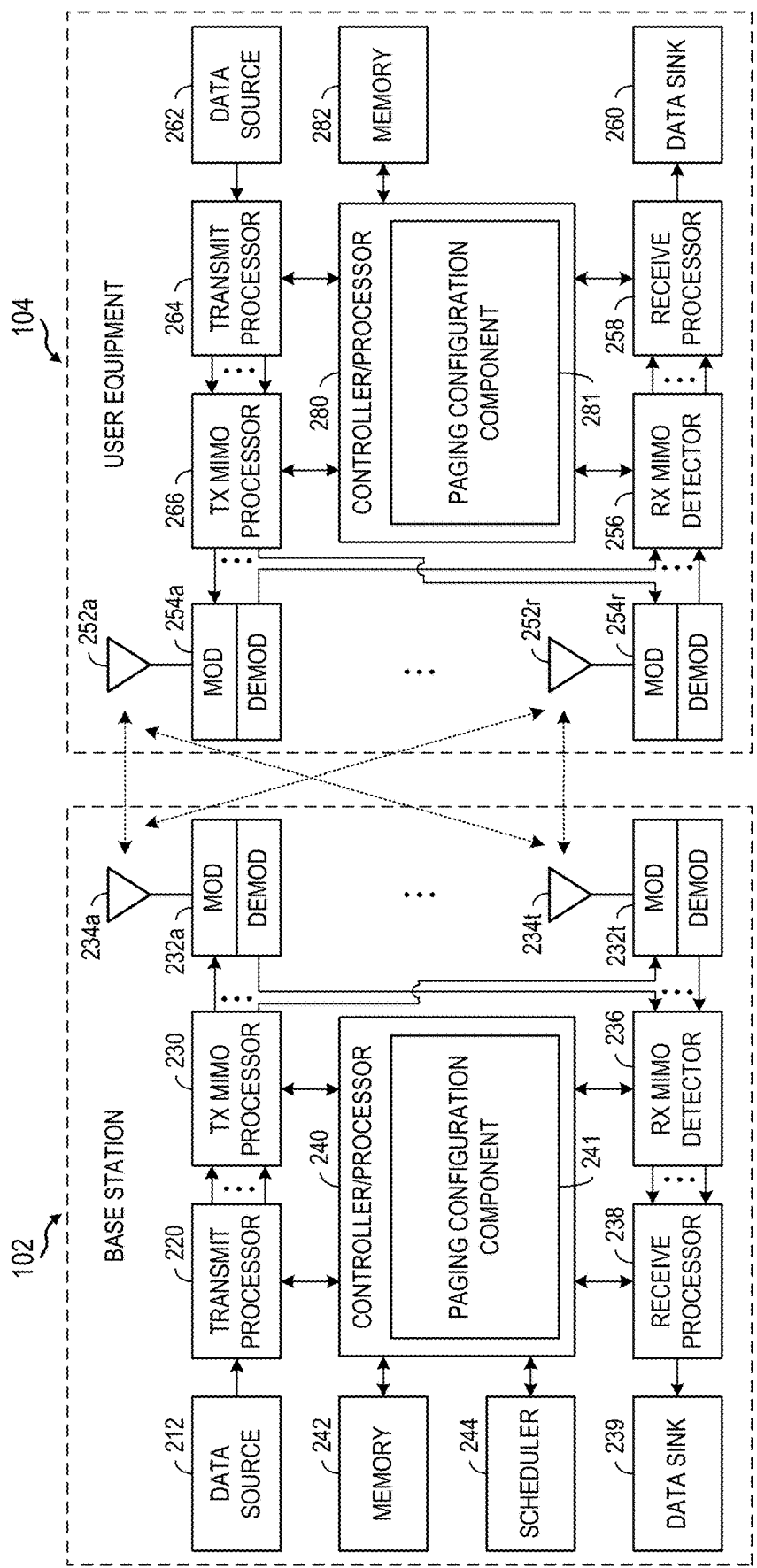
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes paging configuration component 241, which may be representative of paging configuration component 199 of FIG. 1. Notably, while depicted as an aspect of controller/processor 240, paging configuration component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes paging configuration component 281, which may be representative of paging configuration component 198 of FIG. 1. Notably, while depicted as an aspect of controller/processor 280, paging configuration component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHZ-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming. Therefore, multiple transmission reception points (multi-TRPs) or communications via multiple radio access links using the plurality of antennas or panels may be used to counteract path loss or otherwise to improve channel reliability.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same.

Similarly, the transmit and receive directions for UE 104 may or may not be the same.

Further, as described herein, UEs of mmW communications may benefit from improved power management and low signaling overhead. Joint paging configuration according to the present disclosure may apply to different types of UEs to save signaling overhead, as described in details below.

Example Paging Configuration for Different Types of UEs

Figure 4:
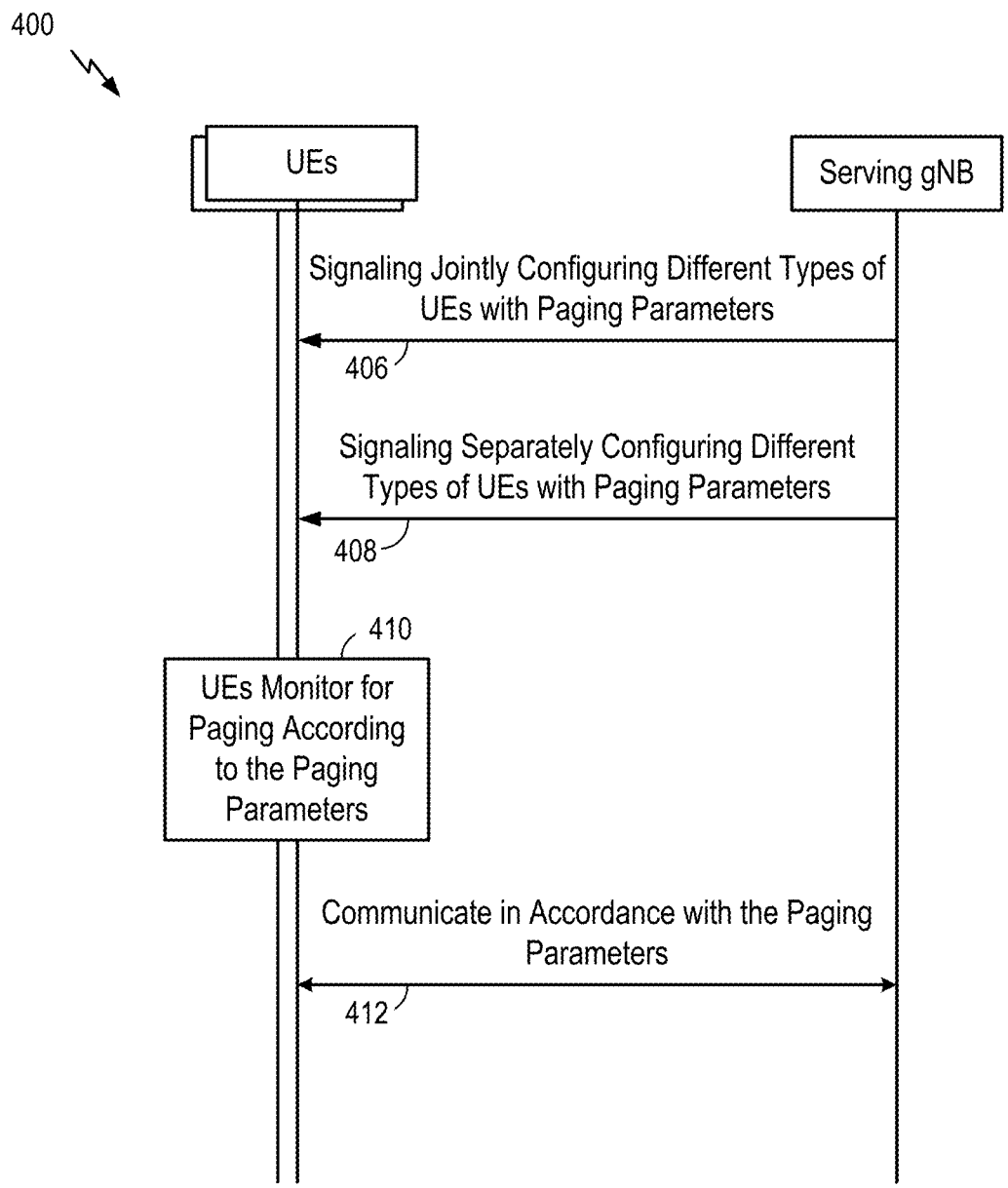
FIG. 4 depicts a call flow diagram between a user equipment (UE) and a serving network, in accordance with certain aspects of the present disclosure.

FIG. 4 depicts a call flow diagram between two or more UEs and a serving network entity (e.g., a gNB), in accordance with certain aspects of the present disclosure. As shown, the gNB may transmit signaling configuring two or more UEs of different types, such as having different capacities.

Due to various design constraints, the different types of UEs may have different data rate, latency, reliability, and battery lifetime performances. For example, a personal wearable device may be subject to more stringent size and weight requirements than a handheld device. Similarly, industrial wireless sensors deployed at large scale are subject to different requirements than devices for video surveillance (e.g., higher data rate, lower latency, and lower reliability).

The present disclosure provides techniques for jointly configuring different types of UEs of different capabilities with a common set of paging parameters, and separately configuring the different types of UEs with a second (e.g., UE specific) set of paging parameters to achieve improved energy efficiency and low signaling overhead.

For example, at 406, the gNB transmits signaling jointly configuring at least first and second types of UEs having different capabilities with a first set of paging parameters. For example, the paging parameters may be configured in the system information block (SIB). The common set of paging parameters can be shared by the different types of UEs. For example, the common set of paging parameters may include paging indications for UE subgroups, certain time/frequency resources, etc. In some cases, the paging parameters may include paging early indication (PEI) parameters that are also configured in SIB. The common set of paging parameters may include PEI parameters.

At 408, the gNB transmits signaling for separately configuring the different types of UEs with a second set of paging parameters. At 410, the UEs monitor for paging according to the (jointly and/or separately) configured paging parameters.

For example, the separately configured parameters may include one or multiple of the following parameters. The DRX cycle may be separately configured for indicating the periodicity for UE to wake up to check whether the UE needs to process a PO. The paging frame (PF) offset may be separately configured for indicating the radio frame where the UE may wake up within a DRX cycle. The number of paging frames within a DRX cycle, and the number of POs per paging frame may be separately configured, such that each of multiple UEs (e.g., UEs receiving the joint paging configurations at 406) may be associated with one PO per DRX cycle.

Figure 5:
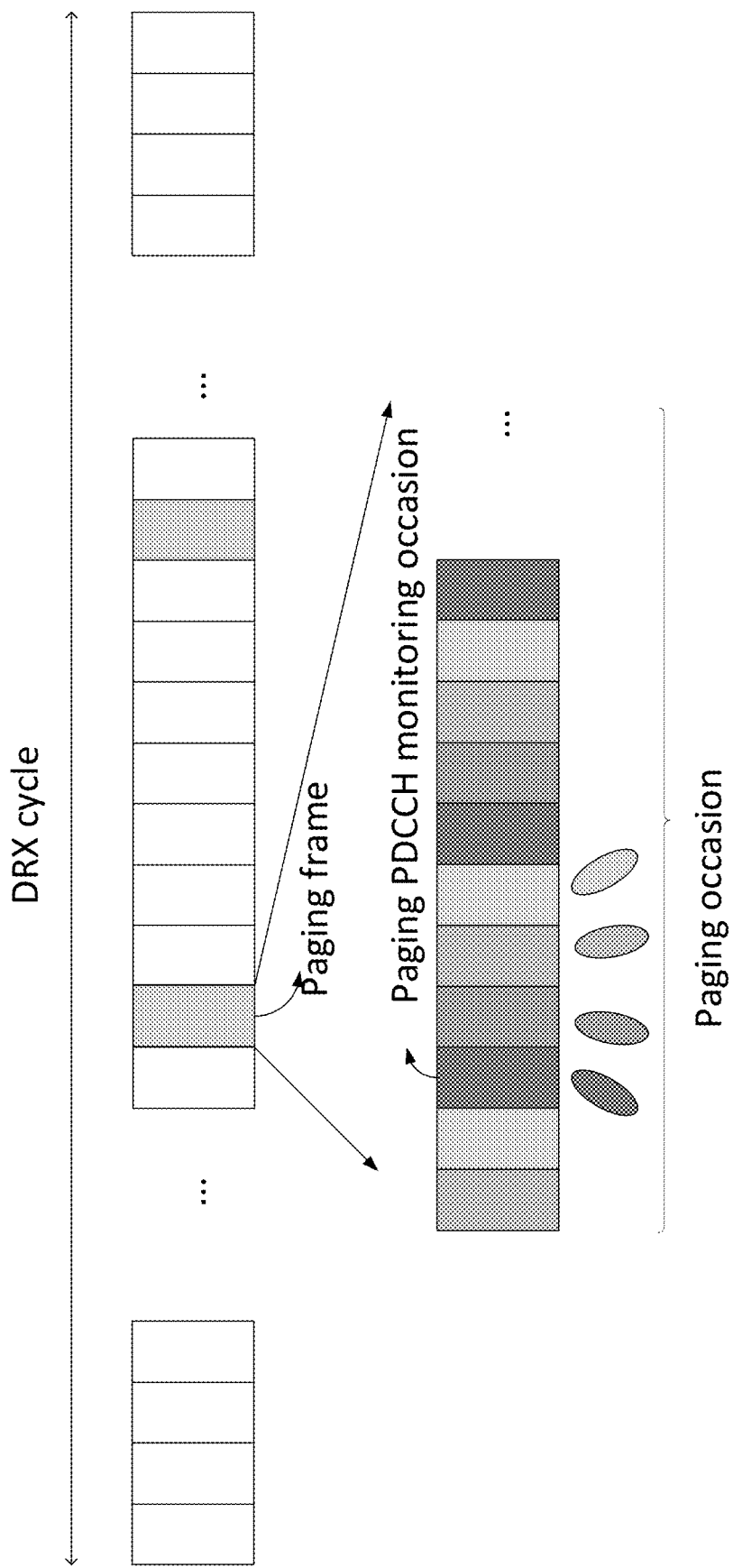
FIG. 5 depicts an example paging frame in a discontinuous reception (DRX) cycle, in accordance with certain aspects of the present disclosure.

An example of a DRX cycle is illustrated in FIG. 5. As shown, in each PF associated with the UE, there may be one PO for the UE. In each PO, paging PDCCH occasions may be configured over all SSB beams and repeated in time.

In addition, the number of PDCCH monitoring occasions corresponding to an SSB within a PO may be separately configured. For example, this number of monitoring occasions indicates the number of repetitions of the paging PDCCH. In some cases, a RedCap UE may be configured with a higher number of repetitions of paging PDCCH to boost the receive signal-to-noise ratio (SNR). Furthermore, a first PDCCH monitoring occasion for paging of each PO of the PF for the UE may be separately configured. The P-RNTI that is used to cyclic redundancy check (CRC) scramble the paging PDCCH may also be separately configured. The paging control resource set (CORESET) and/or paging search space set (SS set) may also be separately configured. The CORESET and SS set are configurations for the paging PDCCH. The PDCCH demodulation reference signal (DMRS) scrambling ID for the paging PDCCH may also be separately configured for the different types of UEs.

In some cases, the gNB may signal joint PEI of different types of UEs. For example, at least one bit information in the RedCap UE's PEI may indicate whether any regular/non-RedCap UE in the PO associated with the PEI is paged. When only one bit information is used, there may be no sub-grouping information of non-RedCap UEs indicated by the PEI of the RedCap UE. As such, the non-RedCap UEs may rely on the PEI of the RedCap UE to determine whether more SSBs are needed to be processed for tracking loop update. For example, the non-RedCap UE may be in deep shadowing that needs more SSBs to be processed to boost the signal-to-noise ratio (SNR). In some cases, the non-RedCap UE may be configured with a PEI that is closer to a PO than that of a RedCap UE.

In some cases, the different types of UEs may at least include a RedCap UE and a regular, non-RedCap UE. As such, the second set of separately configured parameters may correspond to one or more RedCap UEs. A RedCap UE may, for example, have basic features of eMBB, URLLC, and low-power wide-area (LPWA) while being limited in terms of capacity due to cost and power constraints. For example, a non-RedCap UE may have a larger maximum device bandwidth and a greater number of receive branches than a RedCap UE. Other capacity differences may include downlink MIMO layers, downlink modulation order, and/or duplex operation. Therefore, paging configurations for RedCap and non-RedCap UEs require different parameters.

In some cases, the second set of paging parameters may further include PEI locations separately configured for the different types of UEs. For example, PEI locations, signaling, periodicity, and other parameters may be separately configured. The RedCap UE may use a PEI location further away from the start of a PO to have multiple SSBs (an example shown in FIG. 6) between the PEI and the PO for the UE to update tracking loops. In some cases, the RedCap UE may have less receive antenna gain and need to process more SSBs (e.g., between the PEI and PO, thus positioning the PEI further from the PO). As such, non-RedCap UEs may have PEIs closer to the start of the PO and have a less number of SSBs in between the PEI and PO than those of the RedCap UE.

Figure 6:
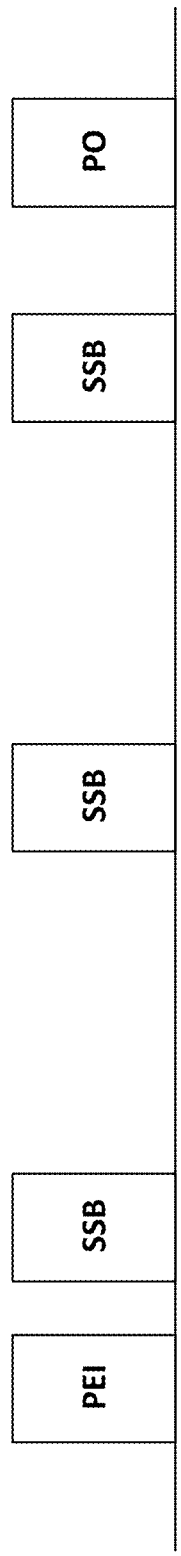
FIG. 6 depicts an example paging early indication (PEI) and a paging occasion (PO), in accordance with certain aspects of the present disclosure.

As shown in FIG. 6, the PEI may indicate whether the UE should process the following PO, which includes paging PDCCH and paging PDSCH if the UE is paged. The UE may need to process more SSBs if the UE is indicated to decode the paging PDSCH early. For example, decoding PDSCH may have higher accuracy requirements (e.g., for time, frequency, etc.) FIG. 6 illustrates three SSBs in between the PEI and PO. Four or more SSBs may be used to meet higher accuracy requirements.

In some cases, the PEI signaling may be separately configured. For example, a non-RedCap UE may use PDCCH based PEI, for each PDCCH may carry 12 bits or more. The PEI signaling for RedCap UEs, on the other hand, may be based on a sequence to allow for non-coherent detection-based wake up receiver to save power. The RNTI may be separately configured to scramble the PDCCH-based PEI, such as when the PEI is based on PDCCH for different types of UEs. The CORESET and SS Set may be also separately configured when PEI is based on PDCCH for different types of UEs.

In some cases, the PEI for RedCap UEs may be repeated while the PEI for non-RedCap UEs needs not be repeated (or repeated in rarer occasions than RedCap UEs). As such, the number of PEI repetitions may be separately configured for RedCap and non-RedCap UEs.

In some cases, RedCap UEs may have longer DRX cycles than those of non-RedCap UEs. For example, the period of a DRX cycle for a RedCap UE may be an integer multiple of the period of a DRX cycle of a non-RedCap UE. When the period of a DRX cycle of a non-RedCap UE is increased, another RedCap UE of the same subgroup may correspondingly increase the DRX cycle time period. In some cases, the PEI is transmitted in every DRX cycle for the UE, then the PEI periodicity may be the same as the DRX cycle and needs not be explicitly configured.

Other parameters for UE-specific configurations may also be signaled and not exhaustively enumerated here. Upon receive both the first set of paging parameters and the second set of paging parameters, the UE may be configured accordingly. At 412, the gNB and the different types of UEs may communicate in accordance with the paging parameters.

Example Methods

Figure 7:
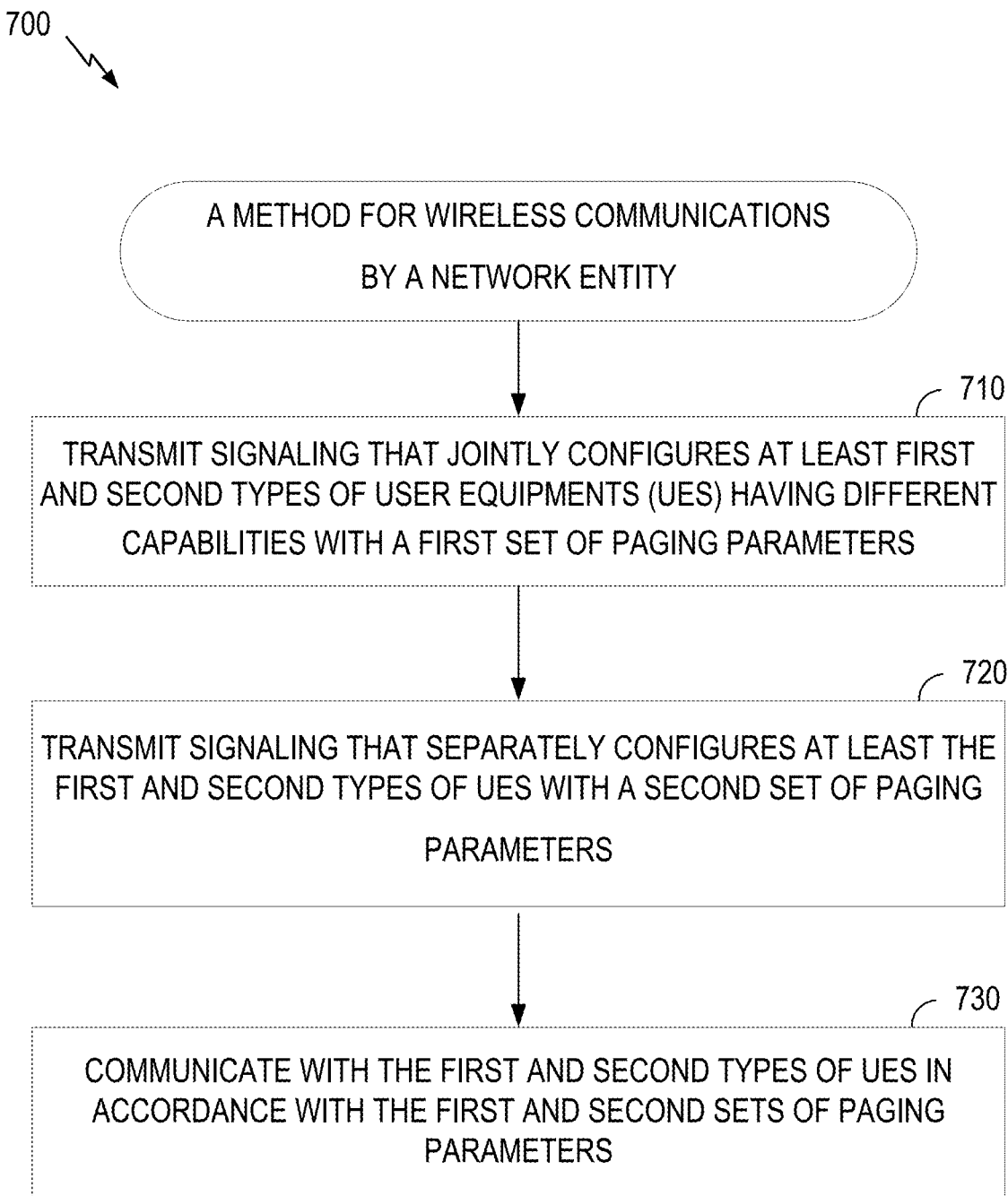
FIG. 7 shows an example methods by a network entity for paging configuration, according to aspects of the present disclosure.

FIG. 7 shows an example of a method 700 for configuring paging parameters according to aspects of the present disclosure. In some aspects, a base station, such as the base station 102 of FIGS. 1 and 2, or processing system 905 of FIG. 9, may perform the method 700.

At operation 710, the system transmits signaling jointly configuring at least first and second types of UEs having different capabilities with a first set of paging parameters. In some cases, the operations of this step refer to, or may be performed by, the circuitry for transmitting as described with reference to FIG. 9.

At operation 720, the system transmits signaling separately configuring at least the first and the second types of UEs with a second set of paging parameters. In some cases, the operations of this step refer to, or may be performed by, the circuitry for transmitting as described with reference to FIG. 9. Although operations 710 and 720 are illustrated separately, the system may transmit signaling of both the first and the second set of paging parameters. For example, the system may transmit system information block (SIB) messages including both the first set of paging parameters for jointly configuring UEs of different capabilities and the second set of paging parameters for UE-specific paging configurations.

At operation 730, the system communicates with the first and the second types of UEs in accordance with the first and the second sets of paging parameters. In some cases, the operations of this step refer to, or may be performed by, the circuitry for communicating as described with reference to FIG. 9.

FIG. 8 shows an example of a method 800 for configuring paging parameters according to aspects of the present disclosure. In some aspects, a user equipment, such as the UE 104 of FIGS. 1 and 2, or processing system 1005 of FIG. 10, may perform the method 800. The method 800 may be complementary to the method 700 as discussed above.

At operation 810, the system receives, from a network entity, signaling jointly configuring at least first and second types of UEs having different capabilities with a first set of paging parameters. In some cases, the operations of this step refer to, or may be performed by, the circuitry for receiving as described with reference to FIG. 10.

At operation 820, the system receives, from the network entity, signaling separately configuring at least the first and the second types of UEs with a second set of paging parameters. For example, the second set of paging parameters may be specific to one of the different types of UEs. In some cases, the operations of this step refer to, or may be performed by, the circuitry for receiving as described with reference to FIG. 10.

At operation 830, the system communicates with the network entity in accordance with the first and the second sets of paging parameters. In some cases, the operations of this step refer to, or may be performed by, the circuitry for communicating as described with reference to FIG. 10.

In some aspects, the first set of paging parameters and the second set of paging parameters may include one or more paging parameters and one or more paging early indication (PEI) parameters. For example, the PEI parameters may be for a sub-group of UEs. In some cases, the system may configure the first or the second set of paging parameters or both in a system information block (SIB).

In some cases, the second set of paging parameters may include at least one of: a discontinuous reception (DRX) cycle; a paging frame offset; a number of paging frames in the DRX cycle; a number of paging occasions in one of the number of paging frames; or a number of physical downlink control channel (PDCCH) monitoring occasions corresponding to a synchronization signal block (SSB) within one of the number of paging occasions.

In some cases, the second set of paging parameters further includes at least one of: a first PDCCH monitoring occasion for paging each paging occasion (PO) of a corresponding paging frame; a paging radio network temporary identifier (RNTI); a paging control resource set (CORESET); a paging search space set; or a PDCCH demodulation reference signal (DMRS) scrambling identifier for the PDCCH.

In certain aspects, the at least the first and second types of UEs include at least one reduced capability (Redcap) UE and at least one non-Redcap UE. In some cases, the first type and the second type of paging parameters may include one or more paging early indication (PEI) parameters having at least one bit information in a PEI for the RedCap UE, and wherein the at least one bit information indicates whether the at least one non-RedCap UE is paged in a paging occasion associated with the PEI. The at least one bit information in the PEI for the RedCap UE indicates to the at least one non-Redcap UE whether additional synchronization signal blocks (SSBs) are required to be processed for tracking loop update.

In some cases, the second set of paging parameters may include one or more UE-specific PEI parameters configured in a system information block (SIB). For example, the one or more UE-specific PEI parameters comprises at least one of: PEI locations; PEI signaling; a radio network temporary identifier (RNTI); control resource set (CORESET); a number of PEI repetitions; or a PEI periodicity.

Example Wireless Communication Devices

Figure 9:
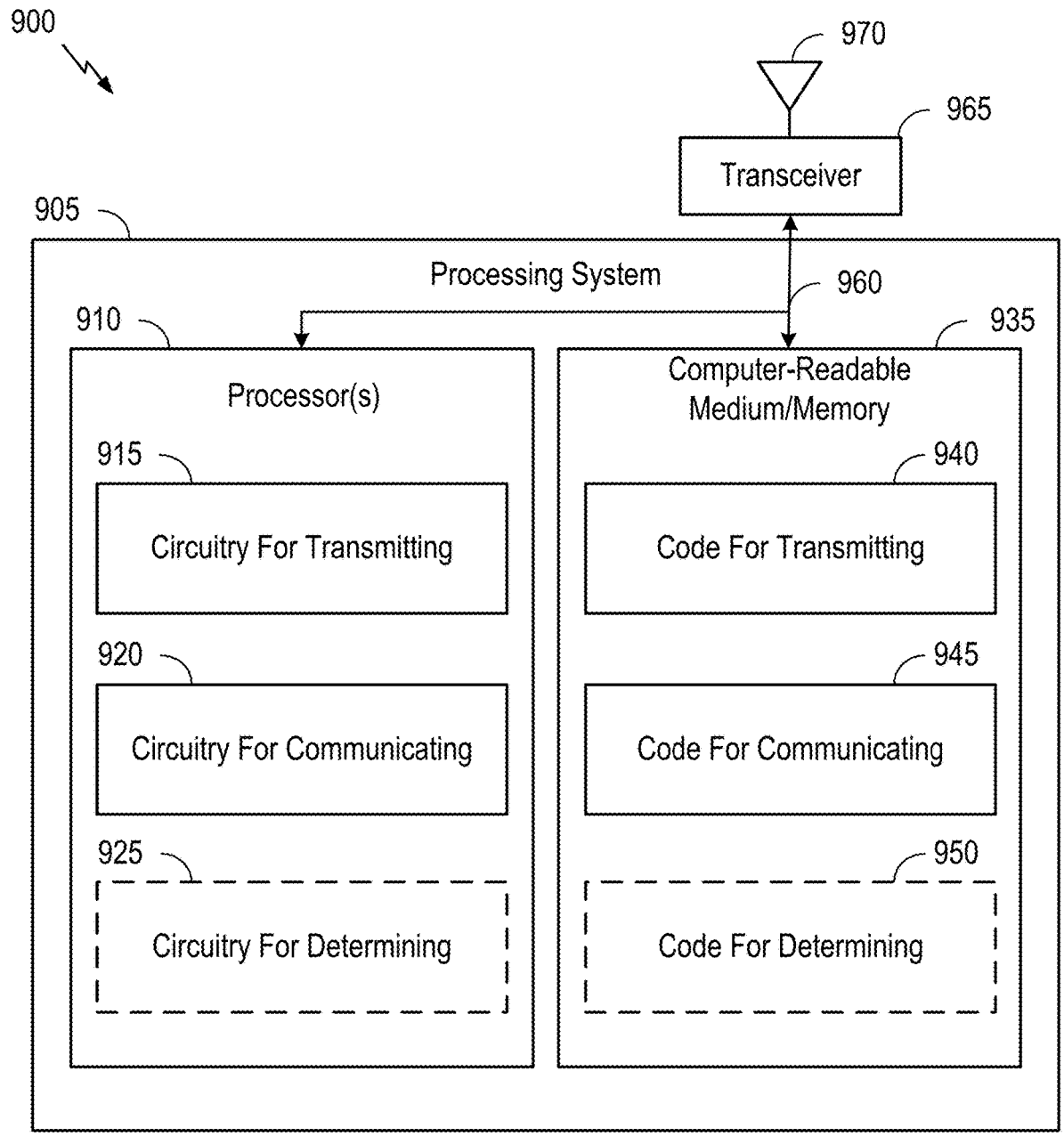
FIGS. 9 and 10 show examples of a communications device according to aspects of the present disclosure.

FIG. 9 depicts an example communications device 900 that includes various components operable, configured, or adapted to perform operations for the techniques disclosed herein, such as the operations depicted and described with respect to FIG. 7. In some examples, communication device may be a base station 102 as described, for example with respect to FIGS. 1 and 2.

Communications device 900 includes a processing system 905 coupled to a transceiver 965 (e.g., a transmitter and/or a receiver). Transceiver 965 is configured to transmit (or send) and receive signals for the communications device 900 via an antenna 970, such as the various signals as described herein. In some aspects, transceiver 965 is an example of, or includes aspects of, the corresponding element described with reference to FIG. 7.

Processing system 905 may be configured to perform processing functions for communications device 900, including processing signals received and/or to be transmitted by communications device 900. In some aspects, the one or more processors 910 are examples of, or include aspects of, the corresponding elements described with reference to FIG. 7.

Processing system 905 includes one or more processors 910 coupled to a computer-readable medium/memory 935 via a bus 960. In certain aspects, computer-readable medium/memory 935 is configured to store instructions (e.g., computer-executable code) that when executed by the one or more processors 910, cause the one or more processors 910 to perform the operations illustrated in FIG. 7, or other operations for performing the various techniques discussed herein. In some aspects, computer-readable medium/memory 935 is an example of, or includes aspects of, the corresponding element described with reference to FIG. 7.

In one aspect, computer-readable medium/memory 935 includes the code for transmitting 940, the code for communicating 945, and the code for determining 950, which enable the BS to perform the operation 700 of FIG. 7.

Examples of a computer-readable medium/memory 935 include random access memory (RAM), read-only memory (ROM), solid state memory, a hard drive, a hard disk drive, etc. In some examples, computer-readable medium/memory 935 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In one aspect, one or more processors 910 includes the circuitry for transmitting 915, the circuitry for communicating 920, and the circuitry for determining 925, which enable the BS to perform the operation 700 of FIG. 7.

Various components of communications device 900 may provide means for performing the methods described herein, including with respect to FIG. 7.

In some examples, means for transmitting or sending (or means for outputting for transmission) may include the transceivers 232 and/or antenna(s) 234 of the base station 102 illustrated in FIG. 2 and/or transceiver 965 and antenna 970 of the communication device in FIG. 9.

In some examples, means for communicating or receiving (or means for obtaining) may include the transceivers 232 and/or antenna(s) 234 of the base station 102 illustrated in FIG. 2 and/or transceiver 965 and antenna 970 of the communication device in FIG. 9.

In some examples, means for determining may include various processing system 905 components, such as: the one or more processors 910 in FIG. 9, or aspects of the base station 102 depicted in FIG. 2, including receive processor 237, transmit processor 220, TX MIMO processor 230, and/or controller/processor 240.

Notably, FIG. 9 is just use example, and many other examples and configurations of communication device are possible.

Figure 10:
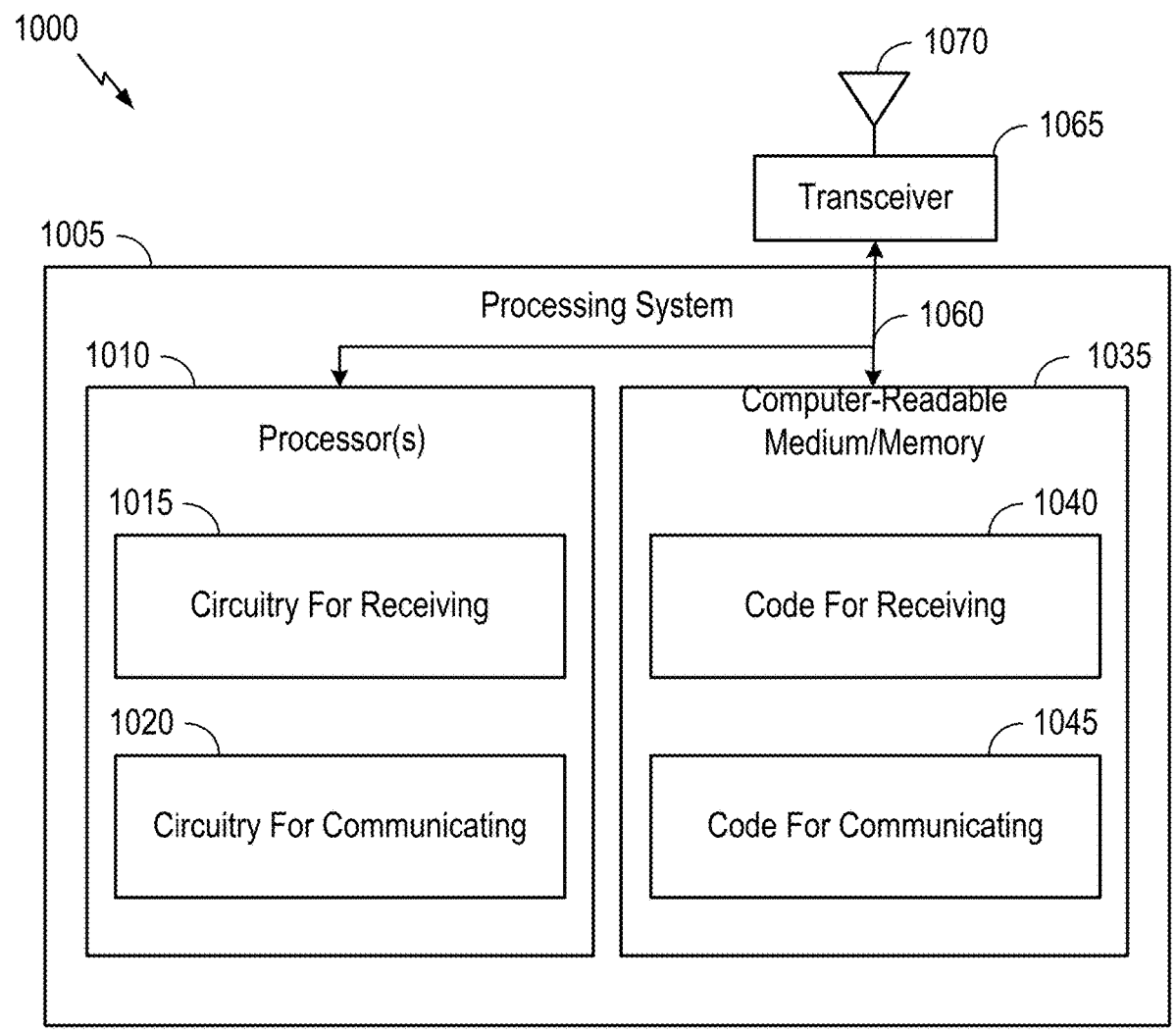

FIG. 10 depicts an example communications device 1000 that includes various components operable, configured, or adapted to perform operations for the techniques disclosed herein, such as the operations depicted and described with respect to FIG. 8. In some examples, communication device may be a user equipment 104 as described, for example with respect to FIGS. 1 and 2.

Communications device 1000 includes a processing system 1005 coupled to a transceiver 1065 (e.g., a transmitter and/or a receiver). Transceiver 1065 is configured to transmit (or send) and receive signals for the communications device 1000 via an antenna 1070, such as the various signals as described herein. A transceiver 1065 may communicate bi-directionally, via antennas 1070, wired, or wireless links as described above. For example, the transceiver 1065 may represent a wireless transceiver 1065 and may communicate bi-directionally with another wireless transceiver 1065. The transceiver 1065 may also include or be connected to a modem to modulate the packets and provide the modulated packets to for transmission, and to demodulate received packets. In some examples, transceiver 1065 may be tuned to operate at specified frequencies. For example, a modem can configure the transceiver 1065 to operate at a specified frequency and power level based on the communication protocol used by the modem.

Processing system 1005 may be configured to perform processing functions for communications device 1000, including processing signals received and/or to be transmitted by communications device 1000. Processing system 1005 includes one or more processors 1010 coupled to a computer-readable medium/memory 1035 via a bus 1060.

In some examples, one or more processors 1010 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1010 are configured to operate a memory array using a memory controller. In other cases, a memory controller is integrated into the one or more processors 1010. In some cases, the one or more processors 1010 are configured to execute computer-readable instructions stored in a memory to perform various functions. In some aspects, one or more processors 1010 include special purpose components for modem processing, baseband processing, digital signal processing, or transmission processing.

In certain aspects, computer-readable medium/memory 1035 is configured to store instructions (e.g., computer-executable code) that when executed by the one or more processors 1010, cause the one or more processors 1010 to perform the operations illustrated in FIG. 8, or other operations for performing the various techniques discussed herein.

In one aspect, computer-readable medium/memory 1035 includes the code for receiving 1040 and the code for communicating 1045, which enable the UE to perform the operation 800 of FIG. 8.

Examples of a computer-readable medium/memory 1035 include random access memory (RAM), read-only memory (ROM), solid state memory, a hard drive, a hard disk drive, etc. In some examples, computer-readable medium/memory 1035 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In one aspect, one or more processors 1010 includes the circuitry for receiving 1015 and the circuitry for communicating 1020, which enable the UE to perform the operation 800 of FIG. 8.

Various components of communications device 1000 may provide means for performing the methods described herein, including with respect to FIG. 8.

In some examples, means for communicating or sending (or means for outputting for transmission) may include the transceivers 254 and/or antenna(s) 252 of the user equipment 104 illustrated in FIG. 2 and/or transceiver 1065 and antenna 1070 of the communication device in FIG. 10.

In some examples, means for receiving (or means for obtaining) may include the transceivers 254 and/or antenna(s) 252 of the user equipment 104 illustrated in FIG. 2 and/or transceiver 1065 and antenna 1070 of the communication device in FIG. 10.

In some examples, means for processing or configuring may include various processing system 1005 components, such as: the one or more processors 1010 in FIG. 10, or aspects of the user equipment 104 depicted in FIG. 2, including receive processor 258, transmit processor 264, TX MIMO processor 266, and/or controller/processor 218 (including paging configuration component 281).

Notably, FIG. 10 is just use example, and many other examples and configurations of communication device are possible.

EXAMPLE CLAUSES

Implementation examples are described in the following numbered clauses:

Clause 1: A method for wireless communications by a network entity, comprising: transmitting signaling jointly configuring at least first and second types of user equipments (UEs) having different capabilities with a first set of paging parameters; transmitting signaling separately configuring at least the first and second types of UEs with a second set of paging parameters; and communicating with the first and second types of UEs in accordance with the first and second sets of paging parameters.

Clause 2: The method of Clause 1, wherein the first set of paging parameters and the second set of paging parameters comprise one or more paging parameters and one or more paging early indication (PEI) parameters.

Clause 3: The method of Clause 2, further comprising configuring the first or the second set of paging parameters or both in a system information block (SIB).

Clause 4: The method of Clause 3, wherein the second set of paging parameters comprises at least one of: a discontinuous reception (DRX) cycle; a paging frame offset; a number of paging frames in the DRX cycle; a number of paging occasions in one of the number of paging frames; or a number of physical downlink control channel (PDCCH) monitoring occasions corresponding to a synchronization signal block (SSB) within one of the number of paging occasions.

Clause 5: The method of Clause 4, wherein the second set of paging parameters further comprises at least one of: a first PDCCH monitoring occasion for paging each paging occasion (PO) of a corresponding paging frame; a paging radio network temporary identifier (RNTI); a paging control resource set (CORESET); a paging search space set; or a PDCCH demodulation reference signal (DMRS) scrambling identifier for the PDCCH.

Clause 6: The method of Clause 1, wherein the at least the first and second types of UEs comprise at least one reduced capability (Redcap) UE and at least one non-Redcap UE.

Clause 7: The method of Clause 6, wherein the first type and the second type of paging parameters comprise one or more paging early indication (PEI) parameters having at least one bit information in a PEI for the RedCap UE, and wherein the at least one bit information indicates whether the at least one non-RedCap UE is paged in a paging occasion associated with the PEI.

Clause 8: The method of Clause 7, wherein the at least one bit information in the PEI for the RedCap UE indicates to the at least one non-Redcap UE whether additional synchronization signal blocks (SSBs) are required to be processed for tracking loop update.

Clause 9: The method of Clause 2, wherein the second set of paging parameters comprises one or more UE-specific PEI parameters configured in a system information block (SIB).

Clause 10: The method of Clause 9, wherein the one or more UE-specific PEI parameters comprises at least one of: PEI locations; PEI signaling; a radio network temporary identifier (RNTI); control resource set (CORESET); a number of PEI repetitions; or a PEI periodicity.

Clause 11: A method for wireless communications by a user equipment (UE), comprising: receiving, from a network entity, signaling jointly configured for at least first and second types of user equipments (UEs) having different capabilities with a first set of paging parameters; receiving, from the network entity, signaling separately configured for the UE with a second set of paging parameters; and communicating with the network entity in accordance with the first and second sets of paging parameters.

Clause 12: The method of Clause 11, wherein the first set of paging parameters and the second set of paging parameters comprise one or more paging parameters and one or more paging early indication (PEI) parameters.

Clause 13: The method of Clause 12, wherein the first or the second set of paging parameters or both are configured in a system information block (SIB).

Clause 14: The method of Clause 13, wherein the second set of paging parameters comprises at least one of: a discontinuous reception (DRX) cycle; a paging frame offset; a number of paging frames in the DRX cycle; a number of paging occasions in one of the number of paging frames; or a number of physical downlink control channel (PDCCH) monitoring occasions corresponding to a synchronization signal block (SSB) within one of the number of paging occasions.

Clause 15: The method of Clause 14, wherein the second set of paging parameters further comprises at least one of: a first PDCCH monitoring occasion for paging each paging occasion (PO) of a corresponding paging frame; a paging radio network temporary identifier (RNTI); a paging control resource set (CORESET); a paging search space set; or a PDCCH demodulation reference signal (DMRS) scrambling identifier for the PDCCH.

Clause 16: The method of Clause 11, wherein the at least the first and second types of UEs comprise at least one reduced capability (Redcap) UE and at least one non-Redcap UE.

Clause 17: The method of Clause 16, wherein the first type and the second type of paging parameters comprise one or more paging early indication (PEI) parameters having at least one bit information in a PEI for the RedCap UE, and wherein the at least one bit information indicates whether the at least one non-RedCap UE is paged in a paging occasion associated with the PEI.

Clause 18: The method of Clause 17, wherein the at least one bit information in the PEI for the RedCap UE indicates to the at least one non-Redcap UE whether additional synchronization signal blocks (SSBs) are required to be processed for tracking loop update.

Clause 19: The method of Clause 12, wherein the second set of paging parameters comprises one or more UE-specific PEI parameters configured in a system information block (SIB).

Clause 20: The method of Clause 19, wherein the one or more UE-specific PEI parameters comprises at least one of: PEI locations; PEI signaling; a radio network temporary identifier (RNTI); control resource set (CORESET); a number of PEI repetitions; or a PEI periodicity.

Clause 21: A processing system, comprising: a memory comprising computer-executable instructions; one or more processors configured to execute the computer-executable instructions and cause the processing system to perform a method in accordance with any one of Clauses 1-20.

Clause 22: A processing system, comprising means for performing a method in accordance with any one of Clauses 1-20.

Clause 23: A non-transitory computer-readable medium comprising computer-executable instructions that, when executed by one or more processors of a processing system, cause the processing system to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mm Wave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of [SHORT INVENTION DESCRIPTION] in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by a network entity, comprising a processor coupled to memory and configured to:
   transmit signaling that jointly configures at least first and second types of user equipments (UEs) having different capabilities with a first set of paging parameters;
   transmit signaling that separately configures at least the first and second types of UEs with a second set of paging parameters; and
   communicate with the first and second types of UEs in accordance with the first and second sets of paging parameters,
   wherein the first set of paging parameters and the second set of paging parameters comprise one or more paging parameters and one or more paging early indication (PEI) parameters, and
   wherein the second set of paging parameters comprises one or more UE-specific PEI parameters configured in a system information block (SIB).

2. The apparatus of claim 1, further comprising:
   configuring any of the first set of paging parameters in a system information block (SIB).

3. The apparatus of claim 2, wherein the second set of paging parameters comprises at least one of:
   a discontinuous reception (DRX) cycle;
   a paging frame offset;
   a number of paging frames in the DRX cycle;
   a number of paging occasions in one of the number of paging frames; or
   a number of physical downlink control channel (PDCCH) monitoring occasions corresponding to a synchronization signal block (SSB) within one of the number of paging occasions.

4. The apparatus of claim 3, wherein the second set of paging parameters further comprises at least one of:
   a first PDCCH monitoring occasion for paging each paging occasion (PO) of a corresponding paging frame;
   a paging radio network temporary identifier (RNTI);
   a paging control resource set (CORESET);

a paging search space set; or a PDCCH demodulation reference signal (DMRS) scrambling identifier for the PDCCH.

5. The apparatus of claim 1, wherein the one or more UE-specific PEI parameters comprises at least one of:
PEI locations;
PEI signaling;
a radio network temporary identifier (RNTI);
control resource set (CORESET);
a number of PEI repetitions; or
a PEI periodicity.

6. An apparatus for wireless communications by a network entity, comprising a processor coupled to memory and configured to:
transmit signaling that jointly configures at least first and second types of user equipments (UEs) having different capabilities with a first set of paging parameters;
transmit signaling that separately configures at least the first and second types of UEs with a second set of paging parameters; and
communicate with the first and second types of UEs in accordance with the first and second sets of paging parameters,
wherein the at least the first and second types of UEs comprise at least one reduced capability (Redcap) UE and at least one non-Redcap UE,
wherein the first type and the second type of paging parameters comprise one or more paging early indication (PEI) parameters having at least one bit information in a PEI for the RedCap UE, and
wherein the at least one bit information indicates whether the at least one non-RedCap UE is paged in a paging occasion associated with the PEI.

7. The apparatus of claim 6, wherein the at least one bit information in the PEI for the RedCap UE indicates to the at least one non-Redcap UE whether additional synchronization signal blocks (SSBs) are required to be processed for tracking loop update.

8. An apparatus for wireless communications by a user equipment (UE), comprising a processor coupled to memory and configured to:
receive, from a network entity, signaling jointly configured for at least first and second types of user equipments (UEs) having different capabilities with a first set of paging parameters;
receive, from the network entity, signaling separately configured for the UE with a second set of paging parameters; and
communicate with the network entity in accordance with the first and second sets of paging parameters,
wherein the first set of paging parameters and the second set of paging parameters comprise one or more paging parameters and one or more paging early indication (PEI) parameters, and
wherein the second set of paging parameters comprises one or more UE-specific PEI parameters configured in a system information block (SIB).

9. The apparatus of claim 8, wherein any of the first set of paging parameters is configured in a system information block (SIB).

10. The apparatus of claim 9, wherein the second set of paging parameters comprises at least one of:
a discontinuous reception (DRX) cycle;
a paging frame offset;
a number of paging frames in the DRX cycle;
a number of paging occasions in one of the number of paging frames; or
a number of physical downlink control channel (PDCCH) monitoring occasions corresponding to a synchronization signal block (SSB) within one of the number of paging occasions.

11. The apparatus of claim 10, wherein the second set of paging parameters further comprises at least one of:
a first PDCCH monitoring occasion for paging each paging occasion (PO) of a corresponding paging frame;
a paging radio network temporary identifier (RNTI);
a paging control resource set (CORESET);
a paging search space set; or
a PDCCH demodulation reference signal (DMRS) scrambling identifier for the PDCCH.

12. The apparatus of claim 8, wherein the one or more UE-specific PEI parameters comprises at least one of:
PEI locations;
PEI signaling;
a radio network temporary identifier (RNTI);
control resource set (CORESET);
a number of PEI repetitions; or
a PEI periodicity.

13. An apparatus for wireless communications by a user equipment (UE), comprising a processor coupled to memory and configured to:
receive, from a network entity, signaling jointly configured for at least first and second types of user equipments (UEs) having different capabilities with a first set of paging parameters;
receive, from the network entity, signaling separately configured for the UE with a second set of paging parameters; and
communicate with the network entity in accordance with the first and second sets of paging parameters,
wherein the at least the first and second types of UEs comprise at least one reduced capability (Redcap) UE and at least one non-Redcap UE,
wherein the first type and the second type of paging parameters comprise one or more paging early indication (PEI) parameters having at least one bit information in a PEI for the RedCap UE, and
wherein the at least one bit information indicates whether the at least one non-RedCap UE is paged in a paging occasion associated with the PEI.

14. The apparatus of claim 13, wherein the at least one bit information in the PEI for the RedCap UE indicates to the at least one non-Redcap UE whether additional synchronization signal blocks (SSBs) are required to be processed for tracking loop update.

* * * * *